(12) United States Patent
Floyd et al.

(10) Patent No.: US 10,671,409 B1
(45) Date of Patent: *Jun. 2, 2020

(54) APPLICATION CONFIGURATION TOOL (71) Applicant: OPEN INVENTION NETWORK LLC, Durham, NC (US)

(72) Inventors: Gregory R. Floyd, McDonough, GA (US); Nathan R. Jones, Avondale Estates, GA (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 119 days.

This patent is subject to a terminal disclaimer.

(21) Appl. No.: 15/810,519

(22) Filed: Nov. 13, 2017

Related U.S. Application Data

(63) Continuation of application No. 12/185,440, filed on Aug. 4, 2008, now Pat. No. 9,817,680.

(51) Int. Cl.
*G06F 9/445* (2018.01)
*G06F 8/70* (2018.01)

(52) U.S. Cl.
CPC ............ *G06F 9/44505* (2013.01); *G06F 8/70* (2013.01)

(58) Field of Classification Search
CPC .......................... G06F 8/00–78; G06F 9/44505
See application file for complete search history.

(56) References Cited

U.S. PATENT DOCUMENTS

| 7,499,933 | B1 * | 3/2009 | Simpson |
| 2005/0262499 | A1 * | 11/2005 | Read |
| 2006/0010434 | A1 * | 1/2006 | Herzog et al. |

OTHER PUBLICATIONS

Tumbde, Adwait N., and Michael M. Swift.;A New Model for Managing Configuration Data. University of Wisconsin-Madison Department of Computer Sciences, Oct. 2007. (Year: 2007).*
Bellissard, Luc, et al. "Distributed application configuration.";Proceedings of 16th International Conference on Distributed Computing Systems. IEEE, 1996. (Year: 1996).*
Albrecht, Jeannie R., et al. "Remote Control: Distributed Application Configuration, Management, and Visualization with Plush.", LISA. vol. 7. 2007. (Year: 2007).*

* cited by examiner

*Primary Examiner* — Doon Y Chow
*Assistant Examiner* — Joanne G Macasiano (57) ABSTRACT

A method, system, and program product for generating and processing application settings for a software application using an application configuration component operating on a computer system. An application settings object containing a plurality of application settings is generated for the software application. The application settings object are serialized and stored into an Extensible Markup Language (XML) application settings file on the computer system. A new instance of the application configuration component is generated. A request is received from the software application for an application settings object for a specific environment and module. If located on the computer system, the XML application settings file is deserialized into the application settings object. Each property of the application settings object is then processed and the application settings object is returned to the software application.

31 Claims, 2 Drawing Sheets

FIG. 1

FIG. 2

APPLICATION CONFIGURATION TOOL

CROSS-REFERENCE TO RELATED APPLICATIONS

This application is a continuation of and claims priority from U.S. patent application Ser. No. 12/185,440, filed on Aug. 8, 2008, entitled APPLICATION CONFIGURATION TOOL, now issued U.S. Pat. No. 9,817,680, issued Nov. 14, 2017, incorporated by reference herein in its entirety.

BACKGROUND OF THE INVENTION

Embodiments of the invention relate generally to information processing on a computer network and, more particularly, to methods and systems for storing and using configuration data for multiple environments in a corporate wide area network.

Embodiments of the invention described herein are suitable for use with the .NET Framework. The .NET Framework developed by Microsoft Corporation has two main elements: a virtual machine called the Common Language Runtime (CLR) and the Base Class Libraries (BCL). When a program is developed for .NET in a high level language such as C# or VB.NET, the compiler generates Intermediate Language (IL) which is similar to assembly language code. The CLR then takes the code in IL form and converts it to machine code that it executes. The code that is generated is called managed code. The CLR controls all aspects of allocating memory and lifetime of objects. The BCL is a set of classes and functions that enable the programmer to talk to the operating system and to other technologies, such as XML, ASP.NET and ADO.NET.BCL and eliminates the need to code to the WIN32 application programming interface (API) directly.

The .NET Framework classes (system classes) provide core functionality when building ASP.NET applications. The system classes live within assemblies. The .NET assembly represents the executable file that holds the class. There are two types of assemblies in .NET—private and shared. Private assemblies can be used in a single application and are typically located in an application's bin folder. Shared assemblies can be used across applications and must be loaded into the global assembly cache by the assembly's creator. The .NET system classes are all shared assemblies. The .NET classes are organized logically into hierarchies called namespaces. A namespace is a language feature that appends a prefix to every class name to make the class name unique. Namespaces can be nested several levels deep within the hierarchy.

The .NET classes contain static and instance members. Static (shared) members are shared across all instances of a class; instance members work on a specific instance of an object which means the object instance has to be created before an instance member can be used. Members are the properties, methods, fields, events and constructors that make up a class. A property is an attribute of a class. A method is an action that the class knows how to perform. A field is similar to a property. An event represents something to which a reaction can be made. A constructor is a special type of method that is called when a new object is created.

Remoting enables software components to interact across application domains. The components interacting with each other can be in different processes and systems. This enables programmers to create n-tier distributed applications. Microsoft Corporation's .NET Remoting is an enabler for application communication. The .NET objects are exposed to remote processes, thus allowing interprocess communication. The applications can be located on the same computer, different computers on the same network, or even computers across separate networks. Remote objects are accessed through channels. Channels physically transport the messages to and from remote objects. There are two existing channels: TCP channel and HTTP channel, using the Transport Control Protocol (TCP) and the Hypertext Transfer Protocol (HTTP), respectively.

SUMMARY OF THE INVENTION

Embodiments of the invention are directed to an application configuration tool that provides a centralized method for storing configuration data for Microsoft.NET applications. Embodiments of the invention can support multiple environments (e.g., testing/production) and can be retrieved in concrete .NET class instances as opposed to just strings. While the standard .NET configuration allows for encryption, typically large sections of the configuration file have to be encrypted which greatly diminishes readability.

In embodiments of the invention, encryption is performed on the value only, so that a reader can still easily determine what the encrypted data represents. Embodiments of the invention leverage a serializable class instance into and out of a configuration file. If the class is defined with an encryption attribute, then it further writes the value encrypted and decrypts the value when it reads it. Embodiments of the invention also include a configuration editor to read and/or write at runtime any settings from the appropriate configuration environment and application module.

Embodiments of the invention use a double pass solution, with the first pass being to manipulate the values (e.g., encrypt/decrypt or expand environment variables), and the second pass being standard .NET XML serialization. Caching is used to improve performance. Environment specific values are obtained through naming conventions on the configuration files and registry settings on the server.

In one embodiment, a method, system, and computer program product are provided for generating and processing application settings for a software application using an application configuration component operating on a computer system. An application settings object containing a plurality of application settings is generated for the software application. The application settings object are serialized and stored into an Extensible Markup Language (XML) application settings file on the computer system. A new instance of the application configuration component is generated. A request is received from the software application for an application settings object for a specific environment and module. If located on the computer system, the XML application settings file is deserialized into the application settings object. Each property of the application settings object is then processed and the application settings object is returned to the software application.

The system includes a plurality of components that perform the steps of the method when operated on a computer system. The computer program product includes a computer readable medium having computer instructions embedded therein, the computer readable medium implementing the method when operated on the computer system.

In another embodiment, a method is provided for configuring remoting settings to enable interprocess communications for a software application using an application configuration tool operating on a computer system. A new instance of the application configuration tool is generated. A request is received from the software application to configure remoting settings. A determination is made if the remoting settings are stored in a cache on the computer system and if the remoting settings are found in the cache, a response is returned to the software application that remoting is configured. If the remoting settings are not found in the cache, a determination is made if a remoting configuration file corresponding to the remoting settings is stored on the computer system. If the remoting configuration file is stored on the computer system, remoting is configured from the settings in the remoting configuration file.

BRIEF DESCRIPTION OF THE DRAWINGS

These and other advantages and aspects of the embodiments of the invention will become apparent and more readily appreciated from the following detailed description of the embodiments taken in conjunction with the accompanying drawings, as follows.

DETAILED DESCRIPTION OF THE EMBODIMENTS

The following description of the embodiments of the invention is provided as an enabling teaching of the invention including its best, currently known embodiment. Those skilled in the relevant art will recognize that many changes can be made to the embodiments described, while still obtaining the beneficial results of the disclosed embodiments. It will also be apparent that some of the desired benefits of the embodiments described can be obtained by selecting some of the features of the disclosed embodiments without utilizing other features. Accordingly, those who work in the art will recognize that many modifications and adaptations to the embodiments described are possible and may even be desirable in certain circumstances, and are a part of the invention. Thus, the following description is provided as illustrative of the principles of the embodiments of the invention and not in limitation thereof, since the scope of the invention is defined by the claims.

Known solutions for storing configuration data for multiple environments in a corporate wide area network typically involve set schemas of name-value pairs and rely on application logic to determine how to handle environment specific differences. Because embodiments of the invention uses Extensible Markup Language (XML) serialization, the schema is determined solely by the structures of the classes that are represented by the data. XML serialization allows programs to persist objects by storing them into XML files. XML serialization has been built into the .NET framework. If those classes implement the IXmlSerializable interface which is described below, the classes can completely customize the way they are represented, as long as it is valid XML. Type information is automatically retained through the serialization process, which eliminates most of the problems usually found with storing non-string values in text forms. The embodiments described herein automatically encrypt and decrypt individual fields based on a field attribute.

The IXmlSerializable interface developed by Microsoft for the .Net framework provides custom formatting for XML serialization and deserialization. Implementing this interface gives the user explicit control over the XML schema, as well as fine-grained control of the XML when serializing or deserializing objects at runtime. The IXmlSerializable interface includes the ReadXml and WriteXml methods. The WriteXml method converts an object to its XML representation. The ReadXml method generates an object from its XML representation.

Embodiments of the invention provide a number of capabilities including, but not limited to: (1) read/write configurations that represent .Net classes in external modules; (2) leveraging the signed key (if present) or an internal key to encrypt/decrypt individual fields in a class without any code; (3) supporting multiple configuration files representing different environments that can be uniquely identified using environment variables or the registry; (4) implementing a caching scheme to quickly lookup settings for a given application; (5) supporting web or client/server, or console solutions; (6) supporting a multitude of locations to look for configurations, including the current directory, the web root directory/bin, and a environment specified directory; (7) supporting multiple environments and group environments that can contain different settings using different files or use shared settings in a default or group file (any file without an environment extension is defaulted); (8) securing configuration files to applications at runtime and across environments; (9) a tool that reads and writes settings to configuration files in runtime environments. In exemplary embodiments, the application configuration tool uses Active Directory Groups to secure files so that improper applications or groups of individuals cannot read files for which they are not authorized.

Application Settings

Applications (and components) create "settings classes" to represent the settings needed in the applications. Each application class that needs settings may have its own settings class in a configuration file, or may use settings that are global to the application. Each class to be configured will have a member variable to hold an instance of the appropriate settings class. In the constructor of each configured class, the settings member variable will be loaded using the "GetSettings" method. Settings are then accessed via the public members on the settings classes.

The application configuration (AppConfig) tool in embodiments of the invention supports automatically decrypting strings in the configuration files. The application configuration tool supports automatically resolving environment variables read from the configuration files. The application configuration tool component caches settings to reduce overhead to applications.

Configuration files are named for the assembly that requests the settings from the application configuration tool. For example, if an assembly called BogusComponent.dll loads the settings, the configuration file will be named BogusComponent.config. Configuration files may have an optional environment suffix. If the Bogus.dll has different settings in development (DV), user acceptance (UA), and production environments (PR), it would have files named BogusComponent_DV.config, BogusComponent_UA.config, and BogusComponent_PR.config.

The application configuration tool in embodiments of the invention supports at least the following environments: developer workstation (MY), test machine (TS), development machine (DV), user acceptance machine (UA), BAT Lab machine (QA), non-production machine (NP—includes TS, DV, UA, QA), and production machine (PR).

For web applications, the user will usually need three files: MY, NP, and PR. The MY files are for development workstations and are not deployed to the servers. The NP files are for use on TS, DV, UA, and QA machines. Separate files may be needed for each if the settings are different. PR files are for use on production machines. For WinForms applications, the filename is used without an environment suffix. Workstations do not have an environment setting.

Configuration files are located either in the current working directory or %EnterpriseRoot%\Apps\ApplicationName>\Config (location is used for servers) or %ProgramFiles%\Enterprise\<ApplicationName>\Config (location is used for workstations). The configuration file will be loaded from the following locations. The first configuration file found is used in exemplary embodiments.
1. <current working directory>\<calling assembly>_<env>.config
2. <current working directory>\<calling assembly>.config
3. %EnterpriseRoot%\Apps\<ApplicationName>\Config\<calling assembly><env>.config
4. %EnterpriseRoot%\Apps\<ApplicationName>\Config\<calling assembly>.config
5. %ProgramFiles%\Enterprise\<ApplicationName>\Config\<calling assembly>_<env>.config
6. %ProgramFiles%\Enterprise\<ApplicationName>\Config\<calling assembly>.config The configuration file locations can be overridden using a AppConfig.Self.config file which is global to a machine.

Each class that needs access to the application settings should have a private member variable to hold the settings. This member should be populated in the constructor of the class. Overhead to the application will not be incurred because the application configuration tool caches the settings. The steps for loading application settings are as follows: (1) add a reference to the AppConfig assembly; (2) in each class that needs settings, add a "using" statement for Com.Enterprise.Configuration (i.e. using Com.Enterprise.Configuration); (3) add a private member variable to hold the settings object needed (e.g., private ExampleNestedSettings m_MySettings; and (4) populate the member variable in the class constructor, as illustrated by the following code segment:

```
//Create AppConfig
Com.Enterprise.Configuration.AppConfig appCfg=new AppConfig( );
//Ask for the settings (provide the application name and data type of the settings class)
object tempSettings=appCfg.GetSettings("TestApp", typeof(ExampleNestedSettings));
//Cast the populated settings object to its real type
m_MySettings=(ExampleNestedSettings) tempSettings;
```

An application settings configuration file can be created by hand in a text editor. However, it is much easier to create the configuration file in code. This will ensure the configuration file is in the correct format. In a test application, the user populates the settings object and then uses the "WriteSettings" method to create the file. The "WriteSettings" method should never be called in production, deployed code. The following code segment illustrates writing an application settings file.

```
//Populate the settings object
ExampleNestedSettings mySettings=new ExampleNestedSettings( );
mySettings.Name="Bogus";
mySettings.Stuff={"ABC","DEF","NOP","XYZ" }
mySettings.Database.ConnectString="Data Source=PR05;User ID=user;Password=pswd";
mySettings.Database.SchemaOwner="SampleMgr";
//Create AppConfig
Com.Enterprise.Configuration.AppConfig appCfg=new AppConfig( );
//Write the config file
appCfg.WriteSettings(my Settings, typeof(ExampleNestedSettings),
    @"C:\Temp\ExampleNestedSettings.config",
    @"C:\Enterprise\Assemblies\ExampleAssembly.dll");
```

User Preferences

User preferences should be used only with Windows Forms applications since the settings are retrieved from, and saved to, the user's profile. Windows Forms applications that support user preferences should create "settings classes" to represent the settings needed. Whenever the user's preferences are needed, the settings will be loaded using the "GetUserSettings" method. Settings are then accessed via the public members on the settings classes.

As noted above, in embodiments of the invention, the application configuration tool supports automatically decrypting strings in the configuration files. The application configuration tool supports automatically resolving environment variables read from the configuration files. The application configuration tool component caches settings to reduce overhead to applications.

With user preferences, the caller must specify the name of the configuration file. User preferences do not support environment suffixes as there is no environment setting on workstations since they are all considered production machines.

Configuration files are located at %AppData%\\Enterprise\<ApplicationName>. This location can be overridden using the AppConfig.Self.config file. This file is global to a machine.

User preferences should be used only in Windows Forms applications where the logged in user has a local profile. User preferences are loaded via the following steps: (1) add a reference to the application configuration (AppConfig) assembly; (2) add a "using" statement for Com.Enterprise.Configuration in each class that needs settings (i.e., using Com.Enterprise.Configuration); (3) add a private member variable to hold the settings object needed, e.g., private ExampleUserPreferences userSettings; and (4) where the user preferences are needed, populate them, as illustrated by the following code segment:

```
//Declare user settings class
ExampleUserPreferences userSettings;
//Create AppConfig
Com.Enterprise.Configuration.AppConfig appCfg=new AppConfig( );
//Ask for the settings (provide the application name, data type of the settings class, and file name)
object tempSettings=appCfg.GetUserSettings("TestApp",
    typeof(ExampleUserPreferences),
    "TestApp_UserPreferences");
//Cast the populated settings object to its real type
userSettings=(ExampleUserPreferences) tempSettings;
```

The file will be loaded from the following location:
%AppData%\Enterprise\<ApplicationName>\<calling assembly>_<env>.config This location can be overridden using a AppConfig.Self.config file. This configuration file is global to a machine.

If the user changes his preference while the application is running, the "WriteUserSettings" method can be used to save the preferences to a file.

```
//Make the user's changes to the settings object
// . . .
//Create AppConfig
Com.Enterprise.Configuration.AppConfig appCfg=new AppConfig( );
//Write the user preferences file
appCfg.WriteUserSettings("TestApp", mySettings, typeof(ExampleUserPreferences), "TestApp_UserPreferences");
```

The file will be written to following location:
%AppData%\Enterprise\<ApplicationName>
This location can be overridden using the AppConfig.Self.config file. This file is global to a machine. The location will be that of the first element in the UserPreferences\SearchPathOrder.

Tasks Common to Application and User Settings

A "settings" class should represent the settings needed by an application assembly. For consistency across applications and components, its class name should be suffixed with the word "Settings." Procedures and code segments for creating basic setting classes and nested setting classes are provided below.

Basic Settings Classes:
1. Add a new class to the project:
   ```
   public class ExampleBasicSettings
   { }
   ```
2. Add public members to represent each setting that is needed. Initialize each setting to a default value.
   ```
   public string Name=string.Empty;
   public int Number=0;
   ```

The configuration file for this example could be as follows:
```
<?xml version="1.0" encoding="utf-8" ?>
<ExampleBasicSettings
    xmlns:xsd="http://www.w3.org/2001/XMLSchema"
    xmlns:xsi="http://www.w3.org/2001/XMLSchema-instance">
<Name>TestApp</Name>
<Number>381</Number>
</ExampleBasicSettings>
```

Nested Settings Classes:
1. Add a new class to the project.
   ```
   public class ExampleNestedSettings
   { }
   ```
2. Add a reference to the AppConfig assembly or some other assembly containing setting objects.
3. In the ExampleNestedSettings class, add public members to represent each setting that is needed. These members may be other settings objects. Initialize each setting to a default value.
   ```
   public string Name=string.Empty;
   public string[ ] Stuff={"hello", "world", "goodbye" };
   public ExampleBasicSettings OtherSettings=new ExampleBasicSettings( );
   ```

The configuration file for this example could be as follows:
```
<?xml version="1.0" encoding="utf-8" ?>
<ExampleNestedSettings
    xmlns:xsd="http://www.w3.org/2001/XMLSchema"
    xmlns:xsi="http://www.w3.org/2001/XMLSchema-instance">
<Name>TestApp</Name>
<Stuff>
    <string>hello</string>
    <string>world</string>
    <string>goodbye</string>
</Stuff>
<OtherSettings>
<Name>TestApp</Name>
<Number>381</Number>
</OtherSettings>
</ExampleNestedSettings>
```

Encrypting Values with Encrypted Attribute

Any sensitive information stored in a configuration file must be encrypted in that file. Items that should be encrypted include, but are not limited to, database connection strings, usernames or security identifiers (SIDs), and passwords. In embodiments of the invention, the application configuration tool provides an efficient mechanism to deal with encrypted values. The value is always encrypted in the configuration file and then decrypted when accessed by the running code. Procedures and code segments for encrypting settings class members are outlined below.

1. Create a settings class:
   ```
   public class ExampleSettings
   {
       public string Name=string.Empty;
       public string ConnectString=string.Empty;
       public string Password=string.Empty;
       public string AnotherSetting=string.Empty;
   }
   ```
2. Add a "using" statement for Com.Enterprise.Configuration.Attributes: using Com.Enterprise.Configuration.Attributes;
3. Add the Encrypted attribute to the settings class members that need to be encrypted: public class ExampleSettings
   ```
   {
       public string Name=string.Empty;
       [Encrypted( )]
       public string ConnectString=string.Empty;
       [Encrypted( )]
       public string Password=string.Empty;
       public string AnotherSetting=string.Empty;
   }
   ```

The Encrypted attribute can be used for both application settings and user preferences.
It can be applied to settings class members of the following types:
   string or System.String
   string[ ] or System.String[ ]

When the "WriteSettings" method is called to create the configuration file, settings marked with Encrypted will be encrypted. In embodiments of the invention, encrypted values in the settings file will be prefixed with "ace1." This identifies the version of the encryption algorithm that should be used to decrypt the value. For testing purposes, a prefix of "text" may be used to indicate the value is not encrypted. This feature is intended for troubleshooting only and should not be used in a production environment. When encrypted values are loaded and accessed in the application, they will be decrypted automatically using the appropriate algorithm.

Creating a Utility to Update Settings

In order to create a utility to update settings in a settings file, an application (referred to herein as "DevUtils") can be built to load an existing settings file. This utility can be distributed to the enterprise's Information technology (IT) administrative group to update the configuration file. Procedures and code segments for creating a utility to update settings are as follows:

1. In the application code, create a settings class using the Encrypted attribute for any settings that need to be encrypted.
2. Next, create a utility application to allow for updating of the settings file. A single executable (EXE) can be used to maintain all of the configuration files for the application.
3. In Form_Load of the utility application, load the settings from the file and populate the form.
   //Create AppConfig
   Com.Enterprise.Configuration.AppConfig
       appCfg=new AppConfig( );
   //Load config file
   object temp=appCfg.GetSettings("TestApp", typeof (ExampleSettings),
       "MyDAAssembly",
       @"C:
       \Enterprise\Apps\MyAppName\MyDAAssembly.dll");
       ExampleSettings daSettings=(ExampleSettings) temp;
   //Load form fields
   daAssemblyPassword.Text=daSettings.ConnectString;
4. Create a Save button for each configuration file that needs to be saved. Behind that Save button, write the settings file out to a temporary location.

In exemplary embodiments, the IT administrative group users updating the settings file will need the following: (1) application configuration tool installed; (2) developer workstation setup; (3) instructions on setting up the "DevUtils" executable; (4) the "DevUtils" executable; (5) the assembly (DLL) that the settings are for; (6) the current configuration file; (7) instructions for the location where the "DevUtils" executable will write the new file; and (8) instructions on how to change the file name for the appropriate environment.

Encrypting Values Manually

Any sensitive information stored in a configuration file must be encrypted in that file. Items that should be encrypted include, but are not limited to, database connection strings, usernames or security identifiers (SIDs), and passwords. Encrypting values with the Encrypted attribute has been described previously. However, the settings also can be encrypted and decrypted manually. Procedures and code segments for encrypting values in a configuration file manually are as follows:

1. Create a settings class without using the Encrypted attribute:
   public class ExampleSettings
   {
      public string Name=string.Empty;
      public string ConnectString=string.Empty;
      public string Password=string.Empty;
      public string AnotherSetting=string.Empty;
   }
2. Add a "using" statement for Com.Enterprise.Security.Cryptography: using Com.Enterprise.Security.Cryptography;
3. Create a function to build an encryption key. The key should not be hard-coded as a single continuous string:
   //TODO: Change this string for your application
   private const string ENCRYPTION_KEY="djlkfa984379jsdkhkJHhfy980avhoHJIYHIUOGHGhyihoifdhfapyf978473jlkdfha skhfphfkhfklshaf979834ulajflkdhk";
   //TODO: Change this algorithm for your application
   private static string GetEncryptionKey( )
   {
      string s=ENCRYPTION_KEY.Substring(17,5)
         +System.Text.Encoding.ASCII.GetString(new byte[ ]{102,33,68,101,54},0,4)
         +ENCRYPTION_KEY.Length.ToString( )
         +ENCRYPTION_KEY.Substring(4,16);
      return s.Substring(15, 8)+s.Substring(4, 8);
   }
4. Create a function to encrypt a value:
   private string EncryptString(string input)
   {
      Com.Enterprise. Security.Cryptography.CryptoNET crypt=new CryptoNET( );
      //Note: there are additional properies that can be set for encryption
      return crypt.Encrypt(input, GetEncryptionKey( ), true);
   }
5. Create a function to decrypt a value:
   private string DecryptString(string input)
   {
      Com.Enterprise. Security.Cryptography.CryptoNET crypt=new CryptoNET( );
      //Note: there are additional properies that can be set for encryption
      return crypt.Decrypt(input, GetEncryptionKey( ));
   }
6. When the application configuration tool is called to load the settings file, the "DecryptString" method is used to decrypt the value from the file:
   //Create AppConfig
   Com.Enterprise.Configuration.AppConfig
       appCfg=new AppConfig( );
   //Ask for the settings (provide the application name and data type of the settings class)
   object tempSettings=appCfg.GetSettings("TestApp", typeof(ExampleSettings));
   //Cast the populated settings object to its real type
   m_MySettings=(ExampleSettings) tempSettings;
   //Decrypt the encrypted information
   m_MySettings.ConnectString=DecryptString (m_MySettings.ConnectString);
   m_MySettings.Password=DecryptString(m_MySettings.Password);

Creating a Utility to Update Settings

In order to create a utility to update settings in a settings file, an application (referred to herein as "DevUtils") can be built to load an existing settings file. This utility can be distributed to the IT administrative group to update the configuration file. Procedures and code segments for creating a utility to update settings are outlined below.

1. In Form_Load, load the settings file using the "GetSettings" method and specify the file name:
   //Create AppConfig
   Com.Enterprise.Configuration.AppConfig
       appCfg=new AppConfig( );
   //Ask for the settings
   //(provide the application name and data type of the settings class and file name)
   object tempSettings=appCfg.GetSettings("TestApp", typeof(ExampleSettings), "MyDAAssembly");
   //Cast the populated settings object to its real type
   m_MySettings=(ExampleSettings) tempSettings;
   //Decrypt the encrypted information
   m_MySettings.ConnectString=DecryptString(m_MySettings.ConnectString);

m_MySettings.Password=DecryptString(m_MySettings.Password);
2. Also in Form_Load, populate the screen with the values in m_MySettings:
//Populate the form class (decrypt the values that are encrypted in the file)
txtName.Text=m_MySettings.Name;
txtConnectionString.Text=DecryptString(m_MySettings.ConnectString);
txtPassword.Text=DecryptString(m_MySettings.Password);
txtName. txtAnotherSetting=m_MySettings. AnotherSetting;
3. Provide a Save button that will re-encrypt the values and write the file:
//Populate the settings class (reencrypt the values that should be encrypted in the file)
m_MySettings.Name=txtName.Text.Trim( );
m_MySettings.ConnectString=EncryptString(txtConnectionString.Text.Trim( ));
m_MySettings.Password=EncryptString(txtPassword.Text.Trim( ));
m_MySettings.AnotherSetting=txtAnotherSetting.Text.Trim( );
//Create AppConfig
Com.Enterprise.Configuration.AppConfig
  appCfg=new AppConfig( );
//Write the config file
appCfg.WriteSettings(m_MySettings, typeof(ExampleSettings),
  @"C:\Temp\MyDAAssembly.config",
  @"C:\Enterprise\Apps\MyAppName\MyDAAssembly.dll");

Environment Values with Environment Attribute

Many path variables will be stored with path variables like "%SystemRoot%" unresolved. It is then necessary to resolve these variables on the system in which the application is run so that the proper value for that machine is retrieved. The application configuration tool provides an efficient mechanism to deal with environment values. The value is always unresolved in the configuration file and then resolved when accessed by the running code. Procedures and code segments for handling environment variables are as follows:
1. Create a settings class.
   public class ExampleSettings
   {
     public string Name=string.Empty;
     public string AnotherSetting=string.Empty;
   }
2. Add a "using" statement for Com.Enterprise.Configuration.Attributes. using Com.Enterprise. Configuration.Attributes;
3. Add the Environment attribute to the settings class members that need to be encrypted.
   public class ExampleSettings
   {
     public string Name=string.Empty;
       [Environment( )]
     public string AnotherSetting=string.Empty;
   }

The Environment attribute can be used for both application settings and user preferences.
It can be applied to settings class members of the following types:
string or System.String
string[ ] or System.String[ ]

When the "WriteSettings" method is called to create the configuration file, settings marked with Environment will not be changed. When the settings are loaded and accessed in the application, they will be resolved automatically for the machine on which the application is run. If an environment variable cannot be resolved on the system on which it is run, it will be returned as it appears in the configuration file.

In order to create a utility to update settings in a settings file, an application (referred to herein as "DevUtils") can be built that will load an existing settings file. This utility can be distributed to the IT administrative group to update the configuration file. Procedures and code segments for creating a utility to update settings are outlined below.
1. In the application code, create a settings class using the Environment attribute for any settings that need to be resolved when read.
2. Next, create a utility application to allow for easy updating of the settings file. A single executable (EXE) can be used to maintain all of the configuration files for the application.
3. In Form_Load of the utility application, load the settings from the file and populate the form.
//Create AppConfig
Com.Enterprise.Configuration.AppConfig
  appCfg=new AppConfig( );
//Load config file
object temp=appCfg.GetSettings("TestApp", typeof(ExampleSettings),
  "MyDAAssembly",
  @"C:\Enterprise\Apps\MyAppName\MyDAAssembly.dll");
ExampleSettings daSettings=(ExampleSettings) temp;
//Load form fields
daAssemblyPassword.Text=daSettings.ConnectString;
4. Create a Save button for each configuration file that needs to be saved. Behind that Save button, write the settings file out to a temporary location.

Handling Multiple Custom Attributes

The application configuration tool was built to account for the possibility that some settings may require the use of multiple custom attributes such as Encrypted and Environment. It does this by automatically determining the proper order in which to apply the attributes both on the write as well as on the read. If the following attributes were needed, the application configuration tool would automatically apply the attributes in the order of Environment and then Encrypted.
public class ExampleSettings
{
  [Environment( )]
  [Encrypted( )]
  public string AnotherSetting=@"%SystemRoot%\path1";
}
The following code segment yields the same results:
public class ExampleSettings
{
  [Encrypted( )]
  [Environment( )]
  public string AnotherSetting=@"%SystemRoot%\path1";
}
The settings file would then contain an entry that was encrypted:
<AnotherSetting>ace1: eFPbpgvEqExz6oI+v07Gykk0</AnotherSetting>

When this setting is later read into the application from the configuration file, the application configuration tool would decide that the proper order in which to apply the attributes are Encrypted and then Environment.

C:\WINDOWSpath1

Figure 1:
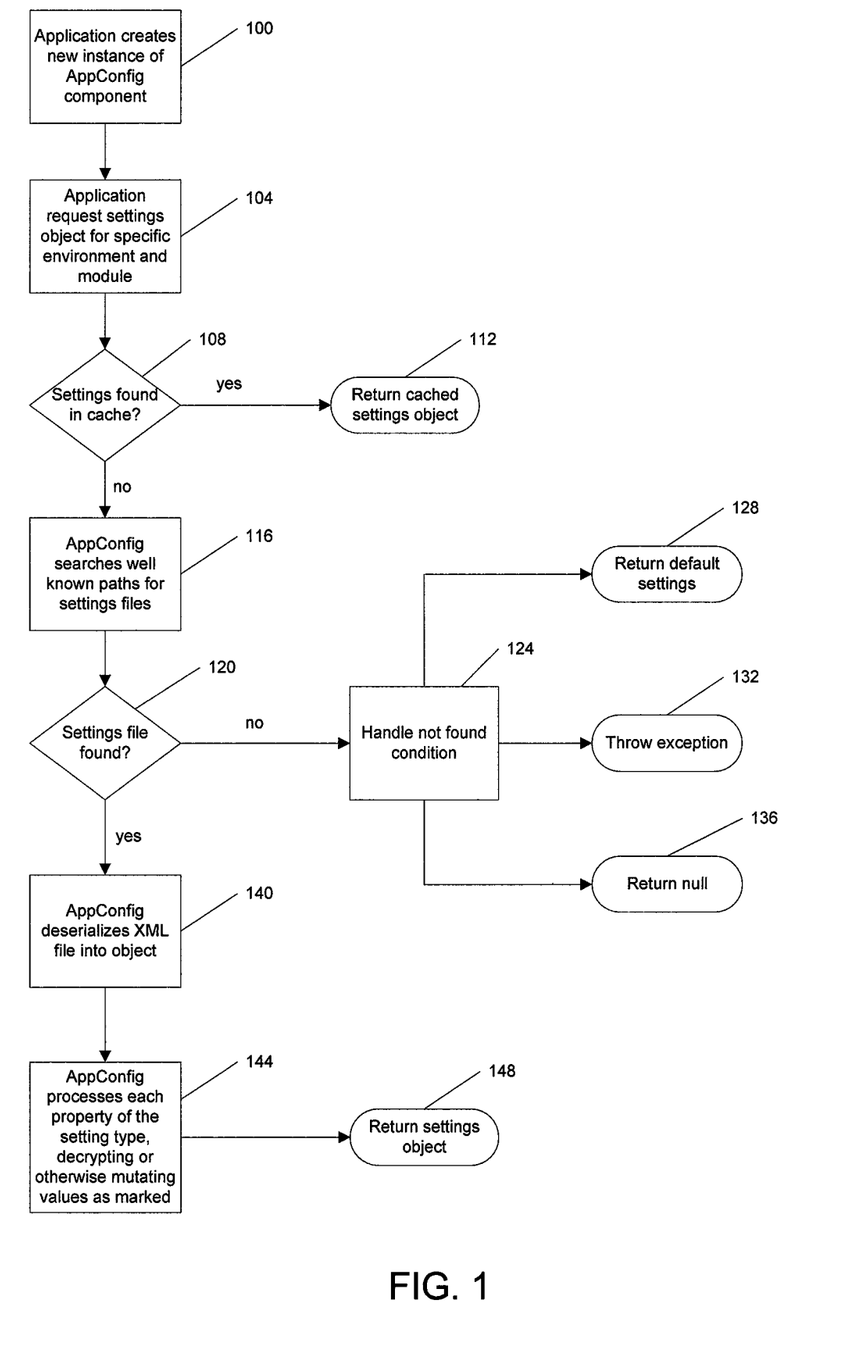
FIG. 1 illustrates processing logic for using the application configuration tool to read application settings in accordance with an exemplary embodiment of the invention.

FIG. 1 illustrates processing logic for using the application configuration tool to read application settings in an exemplary embodiment. Processing logic starts with an application creating a new instance of the application configuration component as indicated in logic block 100. The application requests the settings object for the specific environment and module as indicated in logic block 104. The processing logic then determines if the requested settings are found in a cache as indicated in decision block 108. If the settings are found in the cache, the settings object is returned as indicated in block 112. Otherwise, the settings are not in the cache, therefore, the application configuration tool searches well known paths for the settings filed as discussed above. This step is indicated in logic block 116.

Next, the processing logic determines if the settings file was found in the search step, as indicated in decision block 120. If the settings file was not found, the settings not found condition is handled as indicated in logic block 124. There are three possibilities shown: (1) return default settings (block 128), (2) throw an exception (block 1320, or (3) return a null (block 136). Throwing exceptions is discussed in more detail in the section describing diagnostic information and exceptions. If the settings file was found in decision block 140, the application configuration tool deserializes the XML file into the settings object as indicated in logic block 144. The settings object is then returned as indicated in block 148.

.NET Remoting

.NET Remoting is a Microsoft application programming interface for interprocess communications that enables software components to interact across application domains. .NET Remoting supports various transport and communication protocols and is adaptable to diverse network environments. .NET Remoting relies on the existence of the common language runtime (CLR) assemblies and requires that the clients be built using .NET.

In embodiments of the invention, .NET Remoting can be configured via the business layer components. The user interface layer should not be used to configure remoting since it would require knowing the remoting setup of all data objects used by the application including the reuse components. The business objects are those objects located on the client machine with the user interface. The business objects are the ones that directly access the remote data access objects.

Configuration Files

Figure 2:
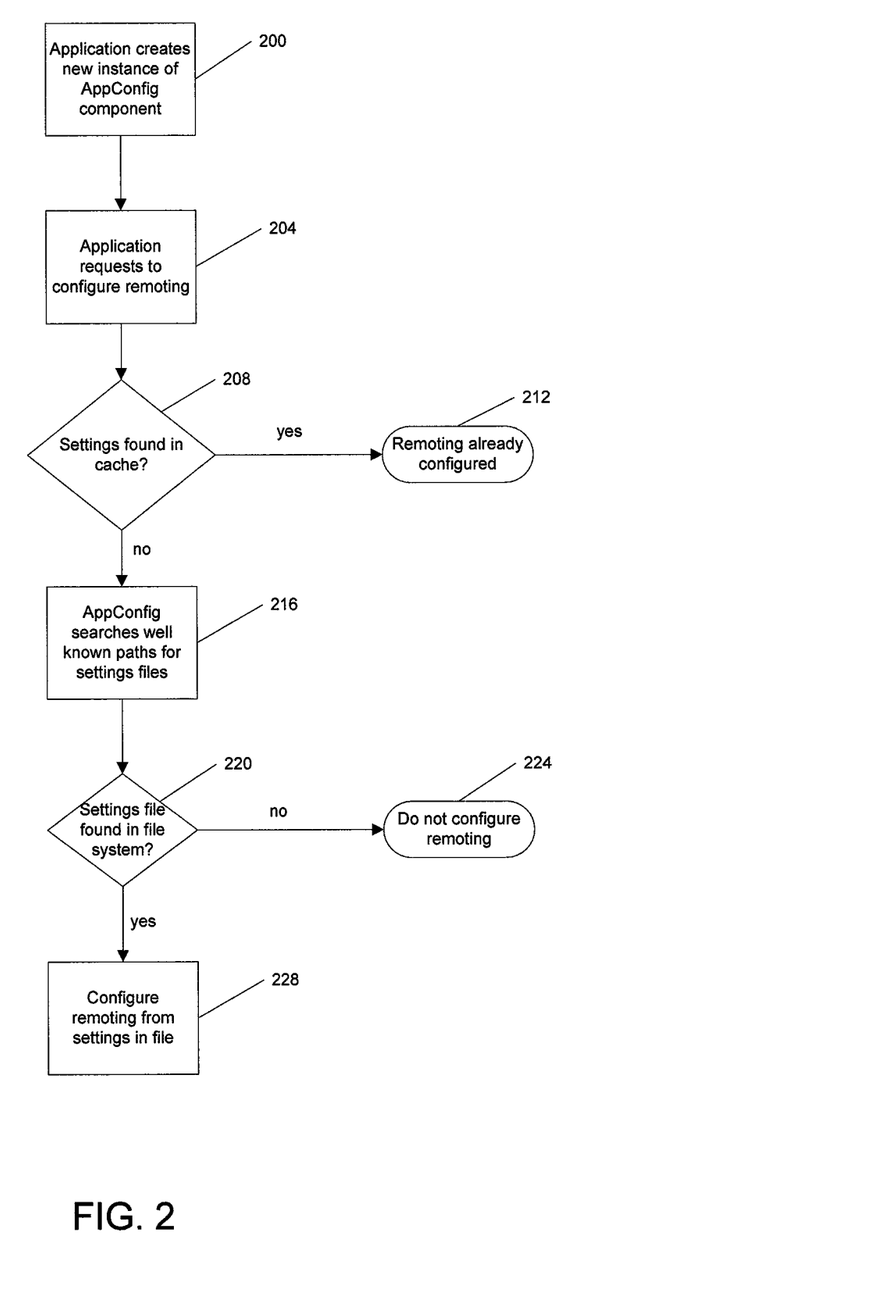
FIG. 2 illustrates processing logic for using the application configuration tool to configure .NET Remoting in accordance with an exemplary embodiment of the invention.

Remoting configuration files are named for the assembly that calls the application configuration tool component. The format <calling assembly>.REMOTING.config must be used. If an assembly called BogusComponent.dll needs to configure remoting, the remoting configuration file will be named BogusComponent.REMOTING.config. Procedures and code segments for configuring Remoting are as follows:

1. When populating the client side remoting configuration file, the channel must be named:
    <channel name="<app name>" ref="http" useDefaultCredentials="true">
2. In the constructor of the client side object, the runtime needs to access the objects specified in the remoting configuration in their remote location:
    //In the constructor of client side objects that access remote objects
    Com.Enterprise.Configuration.AppConfig appCfg=new AppConfig( );
    appCfg.ConfigureRemoting(applicationName);

FIG. 2 illustrates processing logic for using the application configuration tool to configure .NET Remoting in accordance with an exemplary embodiment. Processing logic starts with an application creating a new instance of the application configuration component as indicated in logic block 200. The application requests to configure remoting as indicated in logic block 204. The processing logic then determines if the requested settings are found in a cache as indicated in decision block 108. If the settings are found in the cache, remoting is already configured as indicted in block 212. If the settings are not found in the cache, the application configuration tool searches well known paths for the settings filed as discussed above. This step is indicated in logic block 216.

Next, the processing logic determines if the settings file was found in the search step, as indicated in decision block 220. If the settings file was not found, remoting is not configured as indicated in block 224. If the settings file was found in search step 220, remoting is configured from the settings in the file as indicated in block 228.

Diagnostic Information and Exceptions

Embodiments of the application configuration tool do not log diagnostic information. In order to assist developers in troubleshooting, the application configuration tool can provide some public properties and a custom exception class to provide more information.

Determining the Current Environment

The application configuration tool exposes a property called EnvironmentCode to allow calling applications to get the current environment code. This property is used in building the configuration file names. In one exemplary embodiment, valid values are <string.Empty>, MY, DV, TS, UA, QA, PR.

//Create AppConfig
Com.Enterprise.Configuration.AppConfig appCfg=new AppConfig( );
//Ask for the environment code
MessageBox.Show("Current environment:"+appCfg.EnvironmentCode);

Determining how the Settings Class was Populated

Unless an exception is thrown, the application configuration tool always returns a settings class with the type specified by the developer. If a configuration file is not found, then the object is created using the default constructor for the class. In some cases, a developer may need to know if the settings object returned was created via its default constructor, or if a file was used to populate a settings class.

The application configuration tool exposes two properties that can be helpful in determining how the settings class was populated. These properties can also be used to determine if and how remoting is configured.

ConfigExisted—true if the configuration was found either in a file or in the internal cache; otherwise, false.

ConfigLoaded—file name and path for the file that was used to populate the settings; "CACHED" if the settings were retrieved from the cache; otherwise, blank.

//Create AppConfig
Com.Enterprise.Configuration.AppConfig appCfg=new AppConfig( );
//Ask for the settings (provide the application name and data type of the settings class)
object tempSettings=appCfg.GetSettings("TestApp", typeof(ExampleNestedSettings));

```
//Determine how the settings were loaded
if (appCfg.ConfigExisted==false)
   MessageBox.Show("Config file not found.");
else
   MessageBox.Show("Config file found:"+appCfg.Con-
      figLoaded);
//Cast the populated settings object to its real type
m_MySettings=(ExampleNestedSettings) tempSettings;
ToString( ) Method
```

The application configuration tool overrides the inherited "ToString" method. It provides a plain text representation of the current state (i.e., machine name, working directory, etc) of the AppConfig object as well as the most recent TraceDetails.

```
//Log the state of AppConfig and its latest TraceDetails
m_Tracer.LogEvent(appCfg.ToString( ));
Getting Trace Level Details
```

The application configuration tool exposes a property called TraceDetails to allow calling applications to see diagnostic information regarding how the application configuration tool loaded their settings or configured remoting. This property is similar to the TraceDetails property available on the AppConfigException class.

```
//Create AppConfig
Com.Enterprise.Configuration.AppConfig  appCfg=new
   AppConfig( );
//Ask for the settings (provide the application name and
   data type of the settings class)
object     tempSettings=appCfg.GetSettings("TestApp",
   typeof(ExampleNestedSettings));
//Get the trace details
System.Text.StringBuilder sb=new StringBuilder( );
for (int i=0; i<appCfg.TraceDetails.Count; i++)
   sb.Append(appCfg.TraceDetails[i]+"\r\n");
MessageBox.Show("Trace Details: \r\n"+sb.ToString( ));
//Cast the populated settings object to its real type
m_MySettings=(ExampleNestedSettings) tempSettings;
Catching Application Configuration Tool Exception
```

The custom exception is called AppConfigException. This is the only exception type that will be thrown from the application configuration tool. The AppConfigException class will provide the actual exception in the InnerException property. Trace and/or diagnostic information is provided via the TraceDetails property.

Developers may provide a catch block for this exception type whenever settings are loaded or remoting is configured.

```
try
{
   //Load settings or configure remoting
}
catch (AppConfigException appCfgException)
{
   //Deal with exception from AppConfig
}
catch (Exception ex)
{
   //Deal with other exceptions
}
```

The system and method embodiments have been described as computer-implemented processes. It is important to note, however, that those skilled in the art will appreciate that the mechanisms of the disclosed embodiments are capable of being distributed as program products in a variety of forms, regardless of the particular type of physical signal bearing media utilized to carry out the distribution. Examples of signal bearing media include, without limitation, recordable-type media such as diskettes, CD ROMs, flash drives, memory cards, etc.

The corresponding structures, materials, acts, and equivalents of all means plus function elements in any claims below are intended to include any structure, material, or acts for performing the function in combination with other claim elements as specifically claimed.

In addition, it is possible to use some of the features of the embodiments described without the corresponding use of the other features. Accordingly, the foregoing description of the exemplary embodiments is provided for the purpose of illustrating the principles of the invention, and not in limitation thereof, since the scope of the invention is defined solely by the appended claims.

What is claimed:

1. A method, comprising:
   generating an application settings object comprising at least one settings class having a plurality of application settings for a software application operating on a computer system;
   marking at least one settings class member with an encrypted attribute;
   encrypting only a value of the at least one settings class member marked with the encrypted attribute;
   exposing, by an application configuration tool, a property that allows calling applications to get a current environment code used in building configuration file names, wherein a network comprises a plurality of machines comprising at least one developer workstation, at least one non-production machine, and at least one production machine, and the current environment code designates whether a respective machine in the network is a developer workstation, a non-production machine, or a production machine;
   receiving a request from the software application for the application settings object for a specific environment and module;
   when a configuration file is not found, creating the application settings object using a default constructor for a class of the application settings object;
   returning the application settings object to the software application; and
   decrypting an encrypted value of the at least one settings class member when the encrypted value is loaded and accessed in the software application.

2. The method of claim 1, further comprising determining whether the application settings object is located in a computer system cache and returning the application settings object to the software application when the application settings object is found in the cache.

3. The method of claim 1, further comprising determining whether the application settings object is located in a current working directory on the computer system.

4. The method of claim 1, further comprising returning a plurality of default application settings to the software application when requested application settings are not found on the computer system.

5. A method, comprising:
   exposing, by an application configuration tool, a property that allows calling applications to get a current environment code used in building configuration file names, wherein a network comprises a plurality of machines comprising at least one developer workstation, at least one test machine, at least one development machine, at least one non-production machine, and at least one production machine, and the current environment code designates which type a given machine is;

receiving a request from a software application for an application settings object for a specific environment and module, the application settings object comprising at least one settings class having a plurality of application settings for the software application;

marking at least one settings class member with an encrypted attribute;

encrypting only a value of at least one settings class member marked with an encrypted attribute;

determining whether the application settings object is stored in a cache on a computer system and returning the application settings object to the software application when the application settings object is found in the cache;

determining whether an application settings file corresponding to the application settings object is stored on the computer system when the application settings object is not found in the cache;

when a configuration file is not found, creating the application settings object using a default constructor for a class of the application settings object;

returning the application settings object to the software application;

decrypting an encrypted value of the at least one settings class member when the encrypted value is loaded and accessed in the software application.

6. The method of claim 5, further comprising generating the application settings object comprising a plurality of application settings for the software application.

7. The method of claim 6, further comprising:

serializing and storing the application settings object into the application settings file on the computer system; and deserializing the application settings file into the application settings object when the application settings object is found on the computer system.

8. The method of claim 5, further comprising determining whether the application settings object is located in a current working directory on the computer system.

9. The method of claim 5, further comprising returning a plurality of default application settings when requested application settings are not found on the computer system.

10. The method of claim 5, further comprising throwing an exception when requested application settings are not found on the computer system.

11. A method, comprising:

generating an application settings object comprising at least one settings class having a plurality of application settings for a software application;

marking at least one settings class member with an encrypted attribute;

encrypting only a value of the at least one settings class member marked with the encrypted attribute;

exposing, by an application configuration tool, a property that allows calling applications to get a current environment code used in building configuration file names, wherein a network comprises a plurality of machines comprising at least one developer workstation, at least one test machine, at least one development machine, at least one non-production machine, and at least one production machine, and the current environment code designates which machine type a given machine is;

receiving a request from the software application to configure remoting settings;

determining whether the remoting settings are stored in a cache on a computer system and responding to the software application that remoting is configured when the remoting settings are found in the cache;

determining whether a remoting configuration file corresponding to the remoting settings is stored on the computer system when the remoting settings are not found in the cache;

configuring remoting from the remoting settings in the remoting configuration file when the remoting configuration file is stored on the computer system;

when a configuration file is not found, creating the application settings object using a default constructor for a class of the application settings object; and decrypting an encrypted value of the at least one settings class member when the encrypted value is loaded and accessed in the software application.

12. A system, comprising:

a processor configured to execute a plurality of components, the components comprising:

a settings generating component configured to generate an application settings object comprising at least one settings class having a plurality of application settings for a software application, a property exposing component configured to expose a property that allows calling applications to get a current environment code used in a build of configuration file names, wherein a network comprises a plurality of machines comprising at least one developer workstation, at least one non-production machine, and at least one production machine, and the current environment code designates whether a respective machine in the network is a developer workstation, a non-production machine, or a production machine, a request receiving component configured to receive a request from the software application for the application settings object for a specific environment and module, a file checking component configured to create the application settings object via a default constructor for a class of the application settings object when a configuration file is not found, and a settings returning component configured to return the application settings object to the software application;

wherein at least one settings class member is marked with an encrypted attribute;

wherein only a value of the at least one settings class member marked with the encrypted attribute is encrypted;

wherein an encrypted value of the at least one settings class member is decrypted when the encrypted value is loaded and accessed in the software application.

13. The system of claim 12, the processor further configured to execute a cache searching component configured to determine whether the application settings object is located in a computer system cache and return the application settings object to the software application when the application settings object is found in the cache.

14. The system of claim 12, the processor further configured to execute a working directory searching component configured to determine whether the application settings object is located in a current working directory on the computer system.

15. The system of claim 12, the processor further configured to execute a default application settings returning component configured to return a plurality of default application settings to the software application when requested application settings are not found on the computer system.

16. A computer program product comprising a non-transitory computer readable medium having computer readable code stored thereon, the computer readable code configured to:
- generate an application settings object comprising at least one settings class having a plurality of application settings for a software application;
- mark at least one settings class member with an encrypted attribute;
- encrypt only a value of the at least one settings class member marked with the encrypted attribute;
- expose a property that allows calling applications to get a current environment code used in a build of configuration file names, wherein a network comprises a plurality of machines comprising at least one developer workstation, at least one non-production machine, and at least one production machine, and the current environment code designates whether a respective machine in the network is a developer workstation, a non-production machine, or a production machine;
- receive a request from the software application for the application settings object for a specific environment and module;
- when a configuration file is not found, create the application settings object using a default constructor for a class of the application settings object;
- return the application settings object to the software application; and
- decrypt an encrypted value of the at least one settings class member when the encrypted value is loaded and accessed in the software application.

17. The computer program product of claim 16, the computer readable code further configured to determine whether the application settings object is located in a computer system cache and return the application settings object to the software application when the application settings object is found in the cache.

18. The computer program product of claim 16, the computer readable code further configured to determine whether the application settings object is located in a current working directory on a computer system.

19. The computer program product of claim 16, the computer readable code further configured to return a plurality of default application settings to the software application when requested application settings are not found on a computer system.

20. A system, comprising:
a processor configured to execute a plurality of components, the components comprising:
- a property exposing component configured to expose a property that allows calling applications to get a current environment code used to build configuration file names, wherein a network comprises a plurality of machines comprising at least one developer workstation, at least one test machine, at least one development machine, at least one non-production machine, and at least one production machine, and the current environment code designates which machine type a given machine is,
- a request receiving component configured to receive a request from a software application for an application settings object for a specific environment and module, the application settings object comprising at least one settings class having a plurality of application settings for the software application,
- a cache searching component configured to determine whether the application settings object is stored in a cache on a computer system and return the application settings object to the software application when the application settings object is found in the cache,
- a computer system searching component configured to determine whether an application settings file corresponding to the application settings object is stored on the computer system when the application settings object is not found in the cache,
- a file checking component configured to create the application settings object using a default constructor for a class of the application settings object when a configuration file is not found, and
- a settings returning component configured to return the application settings object to the software application,
wherein at least one settings class member is marked with an encrypted attribute;
wherein only a value of the at least one settings class member marked with the encrypted attribute is encrypted;
wherein an encrypted value of the at least one settings class member is decrypted when the encrypted value is loaded and accessed in the software application.

21. The system of claim 20, the processor further configured to execute a settings generating component configured to generate the application settings object comprising a plurality of application settings for the software application.

22. The system of claim 21, the processor further configured to execute:
- a serialization component configured to serialize and store the application settings object into the application settings file on the computer system; and
- a deserialization component configured to deserialize the application settings file into the application settings object when the application settings file is found on the computer system.

23. The system of claim 20, the processor further configured to execute a working directory searching component configured to determine whether the application settings object is located in a current working directory on the computer system.

24. The system of claim 20, the processor further configured to execute a default settings returning component configured to return a plurality of default application settings when requested application settings are not found on the computer system.

25. The system of claim 20, the processor further configured to execute an exception throwing component configured to throw an exception when requested application settings are not found on the computer system.

26. A computer program product comprising a non-transitory computer readable medium having computer readable code stored thereon, the computer readable code configured to:
- expose a property that allows call applications to get a current environment code used in building configuration file names, wherein a network comprises a plurality of machines comprising at least one developer workstation, at least one test machine, at least one development machine, at least one non-production machine, and at least one production machine, and the current environment code designates which machine type a given machine is;
- receive a request from a software application for an application settings object for a specific environment and module, wherein the application settings object comprises at least one settings class having a plurality of application settings for the software application;

determine whether the application settings object is stored in a cache on a computer system and return the application settings object to the software application when the application settings object is found in the cache;

determine whether an application settings file corresponding to the application settings object is stored on the computer system when the application settings object is not found in the cache;

when a configuration file is not found, create the application settings object using a default constructor for a class of the application settings object; and return the application settings object to the software application, wherein at least one settings class member is marked with an encrypted attribute;

wherein only a value of the at least one settings class member marked with the encrypted attribute is encrypted;

wherein an encrypted value of the at least one settings class member is decrypted when the encrypted value is loaded and accessed in the software application.

27. The computer program product of claim 26, the computer readable code further configured to generate the application settings object containing a plurality of application settings for the software application.

28. The computer program product of claim 27, the computer readable code further configured to:
serialize and store the application settings object into the application settings file on the computer system; and
deserialize the application settings file into the application settings object when the application settings object is found on the computer system.

29. The computer program product of claim 26, the computer readable code further configured to determine whether the application settings object is located in a current working directory on the computer system.

30. The computer program product of claim 26, the computer readable code further configured to return a plurality of default application settings when requested application settings are not found on the computer system.

31. The computer program product of claim 26, the computer readable code further configured to throw an exception when requested application settings are not found on the computer system.

\* \* \* \* \*